United States Patent
Sharpless et al.

(10) Patent No.: US 10,541,866 B2
(45) Date of Patent: Jan. 21, 2020

(54) DETECTING AND RESOLVING MULTICAST TRAFFIC PERFORMANCE ISSUES

(71) Applicant: Cisco Technology, Inc., San Jose, CA (US)

(72) Inventors: Laura Sharpless, Sunnyvale, CA (US); Ramanan Vaidyanathan, San Ramon, CA (US); Keerthi Manjunathan Swarnamanjunathan, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 157 days.

(21) Appl. No.: 15/658,945

(22) Filed: Jul. 25, 2017

(65) Prior Publication Data
US 2019/0036771 A1   Jan. 31, 2019

(51) Int. Cl.
| | |
|---|---|
| H04L 12/24 | (2006.01) |
| H04L 12/18 | (2006.01) |
| H04L 12/947 | (2013.01) |
| H04L 12/26 | (2006.01) |

(52) U.S. Cl.
CPC .......... *H04L 41/0816* (2013.01); *H04L 12/18* (2013.01); *H04L 49/25* (2013.01); *H04L 43/0829* (2013.01); *H04L 43/0888* (2013.01)

(58) Field of Classification Search
None
See application file for complete search history.

(56) References Cited

U.S. PATENT DOCUMENTS

| | | | |
|---|---|---|---|
| 5,812,773 | A | 9/1998 | Norin |
| 5,889,896 | A | 3/1999 | Meshinsky et al. |
| 6,108,782 | A | 8/2000 | Fletcher et al. |
| 6,178,453 | B1 | 1/2001 | Mattaway et al. |
| 6,298,153 | B1 | 10/2001 | Oishi |
| 6,343,290 | B1 | 1/2002 | Cossins et al. |
| 6,643,260 | B1 | 11/2003 | Kloth et al. |

(Continued)

FOREIGN PATENT DOCUMENTS

| | | |
|---|---|---|
| CN | 101719930 | 6/2010 |
| CN | 101394360 | 7/2011 |

(Continued)

OTHER PUBLICATIONS

Amedro, Brian, et al., "An Efficient Framework for Running Applications on Clusters, Grids and Cloud," 2010, 17 pages.

(Continued)

*Primary Examiner* — Phirin Sam
*Assistant Examiner* — Sori A Aga
(74) *Attorney, Agent, or Firm* — Polsinelli PC

(57) ABSTRACT

The subject disclosure relates to systems and methods for improving multicast traffic flows in a computer network. In some aspects, a method of the technology includes steps for receiving multicast traffic statistics from each of a plurality of switches in a computer network, aggregating the multicast traffic statistics into a time-series database, and identifying a low-performing multicast flow based on the time-series database. In some aspects, the method can include steps for automatically reconfiguring the computer network to improve the low-performing multicast flow. Systems and machine readable media are also provided.

17 Claims, 4 Drawing Sheets

200

| | Port # | | | | |
|---|---|---|---|---|---|
| FTAG | 0 | 1 | 2 | 3 | N-1 |
| A | X | X | | | |
| B | | X | X | X | |
| C | X | | | X | X |

(56) References Cited

U.S. PATENT DOCUMENTS

| | | |
|---|---|---|
| 6,683,873 B1 | 1/2004 | Kwok et al. |
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,996,615 B1 | 2/2006 | McGuire |
| 7,054,930 B1 | 5/2006 | Cheriton |
| 7,058,706 B1 | 6/2006 | Lyer et al. |
| 7,062,571 B1 | 6/2006 | Dale et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,583,665 B1 | 9/2009 | Duncan et al. |
| 7,606,147 B2 | 10/2009 | Luft et al. |
| 7,644,437 B2 | 1/2010 | Volpano |
| 7,647,594 B2 | 1/2010 | Togawa |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,356 B2 | 7/2013 | Ashok et al. |
| 8,495,725 B2 | 7/2013 | Ahn |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andreis et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,002 B1 | 9/2014 | Dickinson et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,130,846 B1 | 9/2015 | Szabo et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,294,408 B1 | 3/2016 | Dickinson et al. |
| 9,313,048 B2 | 4/2016 | Chang et al. |
| 9,361,192 B2 | 6/2016 | Smith et al. |
| 9,379,982 B1 | 6/2016 | Krishna et al. |
| 9,380,075 B2 | 6/2016 | He et al. |
| 9,432,245 B1 | 8/2016 | Sorenson, III et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,571,570 B1 | 2/2017 | Mutnuru |
| 9,613,078 B2 | 4/2017 | Vermeulen et al. |
| 9,628,471 B1 | 4/2017 | Sundaram et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 2001/0055303 A1 | 12/2001 | Horton et al. |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0034702 A1 | 2/2004 | He |
| 2004/0088542 A1 | 5/2004 | Daude et al. |
| 2004/0095237 A1 | 5/2004 | Chen et al. |
| 2004/0131059 A1 | 7/2004 | Ayyakad et al. |
| 2004/0197079 A1 | 10/2004 | Latvala et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0062187 A1 | 3/2006 | Rune |
| 2006/0104286 A1 | 5/2006 | Cheriton |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0233106 A1 | 10/2006 | Achlioptas et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0080524 A1 | 4/2008 | Tsushima et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0198858 A1 | 8/2008 | Townsley et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |

(56) References Cited

U.S. PATENT DOCUMENTS

| | | |
|---|---|---|
| 2009/0323706 A1 | 12/2009 | Germain et al. |
| 2009/0328031 A1 | 12/2009 | Pouyadou et al. |
| 2010/0036903 A1 | 2/2010 | Ahmad et al. |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0149966 A1 | 6/2010 | Achlioptas et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1 | 7/2011 | Stanisic et al. |
| 2011/0206052 A1 | 8/2011 | Tan et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1 | 11/2011 | Grosser et al. |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0036234 A1 | 2/2012 | Staats et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1 | 8/2013 | Hu et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1 | 2/2014 | Hu et al. |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |

(56) References Cited

U.S. PATENT DOCUMENTS

| | | |
|---|---|---|
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0281173 A1 | 9/2014 | Im et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0295831 A1 | 10/2014 | Karra et al. |
| 2014/0297569 A1 | 10/2014 | Clark et al. |
| 2014/0297835 A1 | 10/2014 | Buys |
| 2014/0310391 A1 | 10/2014 | Sorenson, III et al. |
| 2014/0310417 A1 | 10/2014 | Sorenson, III et al. |
| 2014/0310418 A1 | 10/2014 | Sorenson, III et al. |
| 2014/0314078 A1 | 10/2014 | Jilani |
| 2014/0317261 A1 | 10/2014 | Shatzkamer et al. |
| 2014/0321278 A1 | 10/2014 | Cafarelli et al. |
| 2014/0330976 A1 | 11/2014 | van Bemmel |
| 2014/0330977 A1 | 11/2014 | van Bemmel |
| 2014/0334488 A1 | 11/2014 | Guichard et al. |
| 2014/0362682 A1 | 12/2014 | Guichard et al. |
| 2014/0365680 A1 | 12/2014 | van Bemmel |
| 2014/0366155 A1 | 12/2014 | Chang et al. |
| 2014/0369204 A1 | 12/2014 | Anand et al. |
| 2014/0372567 A1 | 12/2014 | Ganesh et al. |
| 2014/0379938 A1* | 12/2014 | Bosch ............ H04L 47/125 709/242 |
| 2015/0033086 A1* | 1/2015 | Sasturkar ......... G06F 11/0709 714/57 |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0085870 A1 | 3/2015 | Narasimha et al. |
| 2015/0089082 A1 | 3/2015 | Patwardhan et al. |
| 2015/0100471 A1 | 4/2015 | Curry, Jr. et al. |
| 2015/0103827 A1 | 4/2015 | Quinn et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah et al. |
| 2015/0117458 A1 | 4/2015 | Gurkan et al. |
| 2015/0120914 A1 | 4/2015 | Wada et al. |
| 2015/0124622 A1 | 5/2015 | Kovvali et al. |
| 2015/0138973 A1 | 5/2015 | Kumar et al. |
| 2015/0178133 A1 | 6/2015 | Phelan et al. |
| 2015/0189009 A1 | 7/2015 | van Bemmel |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0263901 A1 | 9/2015 | Kumar et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0358850 A1 | 12/2015 | La Roche, Jr. et al. |
| 2015/0365324 A1 | 12/2015 | Kumar et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0026684 A1 | 1/2016 | Mukherjee et al. |
| 2016/0062786 A1 | 3/2016 | Meng et al. |
| 2016/0094389 A1 | 3/2016 | Jain et al. |
| 2016/0094398 A1 | 3/2016 | Choudhury et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0099853 A1 | 4/2016 | Nedeltchev et al. |
| 2016/0099864 A1 | 4/2016 | Akiya et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0156708 A1 | 6/2016 | Jalan et al. |
| 2016/0164780 A1 | 6/2016 | Timmons et al. |
| 2016/0164914 A1 | 6/2016 | Madhav et al. |
| 2016/0182378 A1 | 6/2016 | Basavaraja et al. |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026294 A1 | 1/2017 | Basavaraja et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0149878 A1 | 5/2017 | Mutnuru |
| 2017/0163531 A1 | 6/2017 | Kumar et al. |
| 2017/0171158 A1 | 6/2017 | Hoy et al. |
| 2017/0264663 A1 | 9/2017 | Bicket et al. |
| 2017/0339070 A1 | 11/2017 | Chang et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "A Look at DeltaCloud: The Multi-Cloud API," Feb. 17, 2012, 4 pages.

Author Unknown, "About Deltacloud," Apache Software Foundation, Aug. 18, 2013, 1 page.

Author Unknown, "Architecture for Managing Clouds, A White Paper from the Open Cloud Standards Incubator," Version 1.0.0, Document No. DSP-IS0102, Jun. 18, 2010, 57 pages.

Author Unknown, "Cloud Infrastructure Management Interface—Common Information Model (CIMI-CIM)," Document No. DSP0264, Version 1.0.0, Dec. 14, 2012, 21 pages.

Author Unknown, "Cloud Infrastructure Management Interface (CIMI) Primer," Document No. DSP2027, Version 1.0.1, Sep. 12, 2012, 30 pages.

Author Unknown, "cloudControl Documentation," Aug. 25, 2013, 14 pages.

Author Unknown, "Interoperable Clouds, A White Paper from the Open Cloud Standards Incubator," Version 1.0.0, Document No. DSP-IS0101, Nov. 11, 2009, 21 pages.

(56) References Cited

OTHER PUBLICATIONS

Author Unknown, "Microsoft Cloud Edge Gateway (MCE) Series Appliance," Iron Networks, Inc., 2014, 4 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Author Unknown, "Use Cases and Interactions for Managing Clouds, A White Paper from the Open Cloud Standards Incubator," Version 1.0.0, Document No. DSP-IS00103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Baker, F., "Requirements for IP Version 4 Routers," Jun. 1995, 175 pages, Network Working Group, Cisco Systems.
Beyer, Steffen, "Module "Data::Locations?!"," YAPC::Europe, London, UK,ICA, Sep. 22-24, 2000, XP002742700, 15 pages.
Blanchet, M., "A Flexible Method for Managing the Assignment of Bits of an IPv6 Address Block," Apr. 2003, 8 pages, Network Working Group, Viagnie.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.
Ford, Bryan, et al., Peer-to-Peer Communication Across Network Address Translators, in USENIX Annual Technical Conference, 2005, pp. 179-192.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.

Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Kumar, S., et al., "Infrastructure Service Forwarding for NSH,"Service Function Chaining Internet Draft, draft-kumar-sfc-nsh-forwarding-00, Dec. 5, 2015, 10 pages.
Kunz, Thomas, et al., "OmniCloud—The Secure and Flexible Use of Cloud Storage Services," 2014, 30 pages.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Meraki, "meraki releases industry's first cloud-managed routers," Jan. 13, 2011, 2 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology," http://www.nielsen-admosghere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Quinn, P., et al., "Network Service Header," Internet Engineering Task Force Draft, Jul. 3, 2014, 27 pages.
Quinn, P., et al., "Service Function Chaining (SFC) Architecture," Network Working Group, Internet Draft, draft-quinn-sfc-arch-03.txt, Jan. 22, 2014, 21 pages.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", Wikipedia, May 4, 2014, 4 pages, https://en.wikipedia.org/w/index.php?title=Pipeline2/028Unix%29&oldid=606980114.

(56) References Cited

OTHER PUBLICATIONS

Ye, Xianglong, et al., "A Novel Blocks Placement Strategy for Hadoop," 2012 IEEE/ACTS 11$^{th}$ International Conference on Computer and Information Science, 2012 IEEE, 5 pages.

* cited by examiner

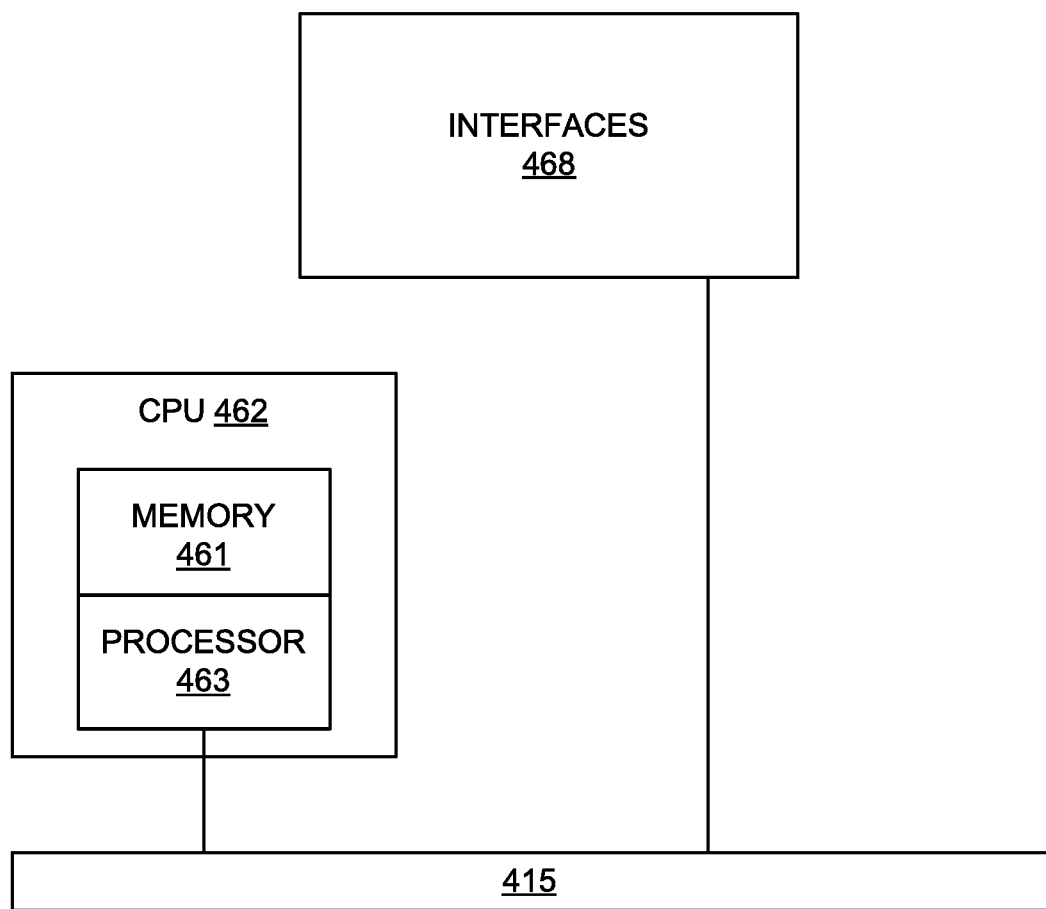

DETECTING AND RESOLVING MULTICAST TRAFFIC PERFORMANCE ISSUES

BACKGROUND

1. Technical Field

The subject technology relates systems and methods for identifying and correcting performance problems in multicast traffic flows. In particular, aspects of the technology provide solutions for moving (e.g., re-rooting) multicast trees to improve multicast performance.

2. Introduction

In some network configurations, several end user terminals, or hosts, may wish to receive the same data at the same time. This data can include anything from video or audio content, or software updates, to information about the network itself. While it would be possible to send this information simultaneously and individually to each host in the network, this would involve the transmission of replicated data throughout the network. Methods of multicasting data have therefore been developed in which data is transmitted through the network only to those destinations or hosts that have indicated a desire to receive the data, for example, by joining a corresponding multicast group. Generally, multicast data is replicated in the network only where the route to two destination hosts splits. Therefore, only one copy of the data is sent through the network until routes to the destination hosts diverge. Data is therefore sent through the network in a multicast tree, from which branches are formed as destination routes diverge.

BRIEF DESCRIPTION OF THE DRAWINGS

Certain features of the disclosed technology are set forth in the appended claims. However, the accompanying drawings, which are included to provide further understanding, illustrate certain aspects and together with the description explain the principles of the subject technology. In the drawings:

FIG. 4 illustrates an example a network device configured to implement various aspects of the subject technology.

DETAILED DESCRIPTION

Figure 1:
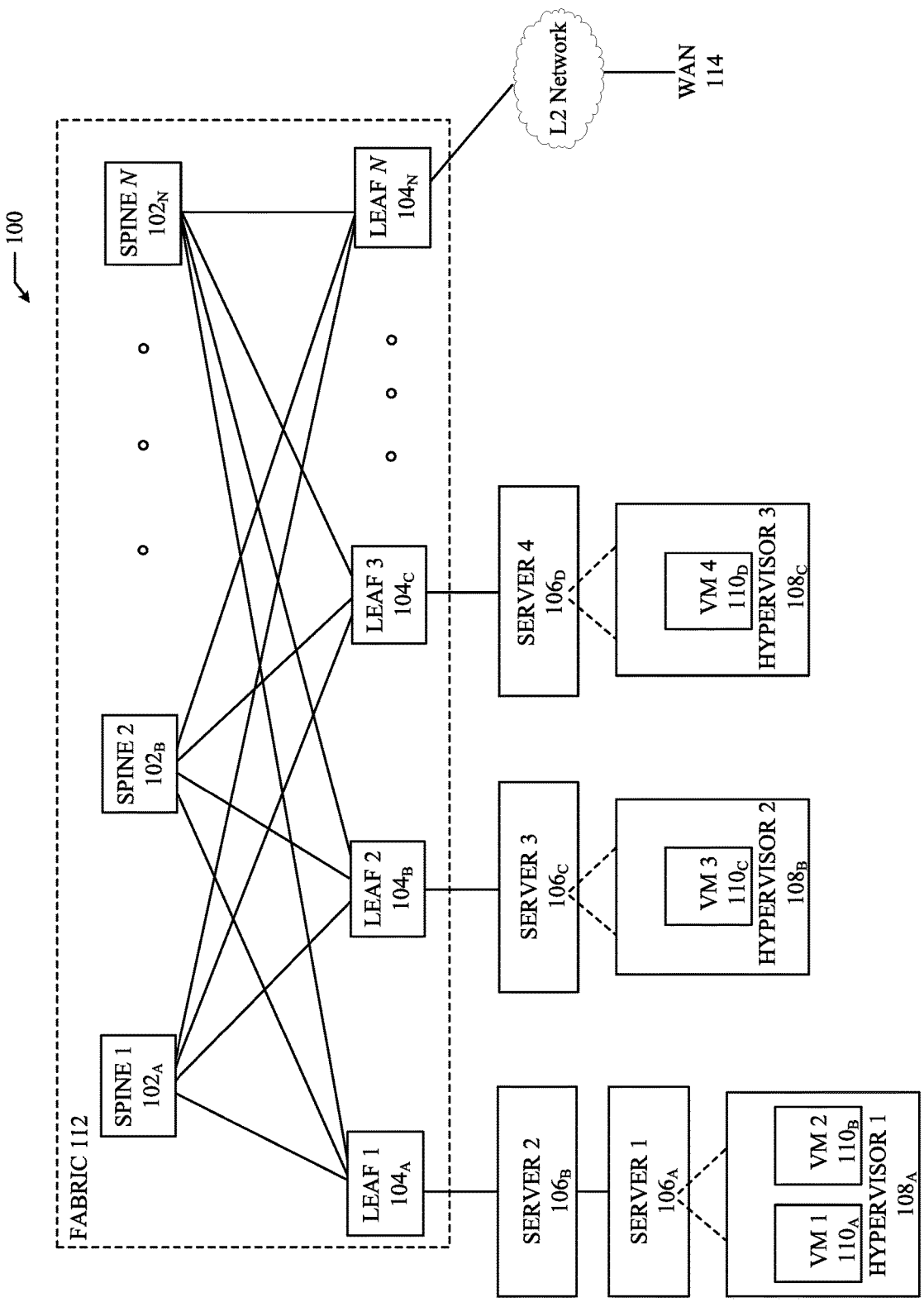
FIG. 1 illustrates an example network environment in which some aspects of the technology can be implemented.

The detailed description set forth below is intended as a description of various configurations of the subject technology and is not intended to represent the only configurations in which the technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring certain concepts of the technology.

Overview:

A method performed for implementing aspects of the technology can include steps for receiving multicast traffic statistics from each of a plurality of switches in a computer network, aggregating the multicast traffic statistics into a time-series database, and using the time-series database, automatically identifying a low-performing multicast flow. In some approaches, the method can further include steps for reconfiguring the network to improve the low-performing multicast flow, e.g., to reduce packet drop events, and improve traffic throughput. As discussed in further detail below, network reconfigurations can be performed automatically, e.g., by a network controller, or another suitable network process. Some reconfigurations can include the suppression of selected communication links (e.g., "links") between network devices, such as link "pruning." In some instances, network reconfiguration can involve the pruning of a given Forwarding Tag ("FTAG"), e.g., by removing a selected FTAG from a list of available FTAGs. Additionally, some network reconfigurations can involve the migration or re-rooting of an entire multicast tree, e.g., from a source switch to a new (destination) switch in the network.

Description:

An increasing amount of network traffic is the result of streaming media applications, such as Live TV. With the proliferation of media traffic, Internet Protocol (IP) multicast performance is rapidly becoming a focal point for cloud providers. When a media stream (such as a live video stream) experiences packet drops, the result is skipped frames, resulting in a degraded end-user experience. To ensure a high quality user experience, datacenters and other providers of media traffic need to proactively monitor their networks to mitigate packet drops.

It is often difficult for network administrators to fix multicast flow problems because conventional network deployments lack tools for identifying multicast issues. For example, in conventional configurations, network administrators must manually trace multicast traffic through the network and identify where drops are happening. This is typically performed by manually reading counters from each switch associated with a low performing multicast flow. Drop events must then be manually traced to pinpoint traffic bottlenecks. It is almost impossible to manually determine what path a multicast tree takes, what flows take those trees, and what trees are experiencing drops in a short enough time to make necessary network changes. Additionally, manually troubleshooting problems associated with multicast flows is not scalable, and therefore must be repeated every time the network experiences performance issues.

Aspects of the disclosed technology address the foregoing problems by providing systems and methods for identifying multicast drop events, and automatically pushing new network configurations to improve traffic flow quality. The technology can be implemented by a network controller, or other system enabled to configure/reconfigure network nodes and links necessary to re-rout multicast trees. In some aspects, the network controller is configured to automatically prune individual links associated with a multicast flow, automatically prune multicast trees associated with a multicast flow, and/or to re-root an entire multicast tree by transferring the root to a new destination switch, such as a new network spine that is determined to be suitable for the associated flow.

In some implementations, a network controller is configured to periodically receive traffic statistics from various switches e.g., spine switches, or other routing devices in the network fabric. Traffic statistics can be transmitted by each reporting switch, using a corresponding hardware offload engine, and can include various types of information about the switch's load and performance. By way of non-limiting example, traffic statistics can include information identifying one or more of: a corresponding switch/spine, port, multicast flow, flow bandwidth, port bandwidth, a number of transmitted or received FTAG packets per port, a total number of packets sent or received and/or packet drop counts.

It is understood that the various traffic statistics can be collected for unicast traffic (e.g., unicast statistics) and/or multicast traffic (e.g., multicast statistics), and transmitted by an offload engine. The traffic statistics are then aggregated by a monitoring device, such as a network controller, or other monitoring process, and stored into a time-indexed database.

The database can then be monitored to identify candidate multicast flows for which network reconfiguration may improve performance, i.e., for which link pruning, multicast (FTAG) pruning, or multicast root-transfer (re-rooting) could reduce drop events.

Selection of a given multicast flow can be performed based on a consideration for the overall impact that would be incurred by the network with the new network configuration. In some approaches, new configurations resulting in a smaller network impact are preferred over reconfigurations that would require major network changes and/or cause significant disruptions to other flows. For example, multicast flows with a greater percentage of packet drops and/or lower overall traffic bandwidth can be prioritized for reconfiguration. Conversely, multicast flows of greater size (bandwidth) may be of a lower priority, due to the potential for causing greater network disruptions. The various parameters used to identify/select network flows for improvement can vary depending on the desired implementation, and in some instances, can be configurable parameters, for example, that are set by a network administrator.

As used herein, link pruning refers to any reconfiguration that re-routes traffic away from an existing link between two network entities. Link pruning can be used to remove a link from the allowable FTAG link-set, so long as reachability is not affected. Multicast tree pruning refers to the elimination of one or more multicast trees from a source switch. Multicast tree pruning is typically performed in where multiple FTAG trees are available for broadcast, and a target multicast tree (FTAG) can be pruned without affecting reachability. In turn, multicast root-transfer (re-rooting), involves the movement of a multicast tree's root from a source switch (e.g., a source spine switch), to a destination switch, such as a new destination spine switch.

Due to a greater potential for traffic disruptions, multicast tree re-rooting may only be performed when link pruning and/or multicast tree pruning are insufficient to resolve performance issues. In some implementations, multicast re-rooting is not performed automatically, but rather, is presented as an option (e.g., to a user or network administrator), together with other information detailing the expected impact of the proposed reconfiguration. This information can include details about the new configuration to be pushed, identification of one or more other links, or potentially affected traffic flows, and/or an identification of one or more network devices to be effected.

FIG. 1 illustrates a diagram of an example network environment 100 in which multicast monitoring can be performed. Fabric 112 can represent the underlay (i.e., the physical network) of environment 100. Fabric 112 includes spine switches 1-N ($102_{A-N}$) (collectively "102") and leaf switches 1-N ($104_{A-N}$) (collectively "104"). Leaf switches 104 can reside at the edge of fabric 112, and can represent the physical network edges. Leaf switches 104 can be, for example, top-of-rack ("ToR") switches, aggregation switches, gateways, ingress and/or egress switches, provider edge devices, and/or any other type of routing or switching device.

Leaf switches 104 can be responsible for routing and/or bridging tenant or endpoint packets and applying network policies. Spine 102 can perform switching and routing within fabric 112. Thus, network connectivity in fabric 112 can flow from spine switches 102 to leaf switches 104, and vice versa.

Leaf switches 104 can provide servers 1-4 ($106_{A-D}$) (collectively "106"), hypervisors 1-4 ($108_A$-$108_D$) (collectively "108"), virtual machines (VMs) 1-4 ($110_A$-$110_D$) (collectively "110"). For example, leaf switches 104 can encapsulate and decapsulate packets to and from servers 106 in order to enable communications throughout environment 100. Leaf switches 104 can also connect other network-capable device(s) or network(s), such as a firewall, a database, a server, etc., to the fabric 112. Leaf switches 104 can also provide any other servers, resources, endpoints, external networks, VMs, services, tenants, or workloads with access to fabric 112.

As discussed in further detail with respect to FIG. 2B below, leaf switches 104 and spine switches 102 can be used to carry multicast flows, for example, to/from one or more hosts in the network (not illustrated).

Figure 2A:
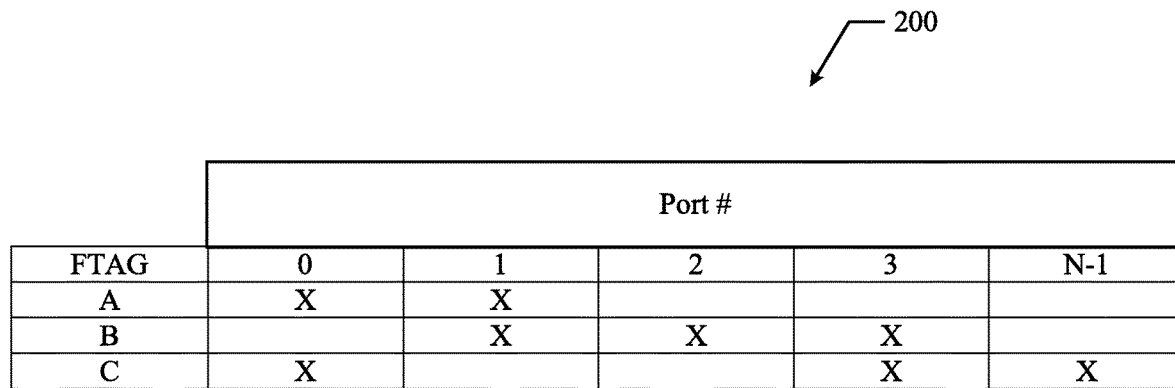
FIG. 2A illustrates an example of a multicast flow (FTAG) and port matrix for a network switch, according to some aspects of the technology.

FIG. 2A illustrates an example of a multicast flow (FTAG) and port matrix 200, that represents FTAG/port associations for a given network switch. Port matrix 200 can be used to facilitate link pruning decisions. The FTAG/port matrix can be compiled and stored at the associated switch and/or a centralized network controller that is coupled to the switch. Port matrix 200 can be used by the network controller to identify candidate links that can be pruned to improve at least one multicast flow. As discussed in detail below, in some instances, link pruning decisions should be based on determinations of host reachability and bandwidth reallocation, i.e., the availability of one or more other links to absorb bandwidth for a pruned link. That is, candidate links can be ranked higher for pruning where host reachability is not impacted, and/or where smaller amounts of traffic are to be redirected in the network.

In some aspects, reachability link pruning decisions can also be pre-conditioned on network reachability. That is, candidate links can only be pruned if it is first determined that reachability for network traffic flowing over those links will not be impacted, i.e., reduced.

Link utilization statistics for each FTAG/port pair can be compared to determine packet drop percentages and bandwidth statistics for each link. In some implementations, bandwidth statistics can include combined measures for multicast traffic and/or unicast traffic; however, in some preferred implementations, only multicast traffic may be considered. The FTAG, port pair with the highest drop percentage, and/or lowest total bandwidth on that FTAG can be selected for link pruning. By way of example, matrix 200 illustrates a configuration in which each port has FTAGs A, B, or C. If FTAG B sends 1 million packets, and experiences 500 packet drops, whereas FTAG A sends 100 thousand packets and experiences 500 packet drops, then FTAG A, having the higher drop percentage, may be prioritized for pruning over FTAG B.

Once a link associated with a specific FTAG is selected for pruning, it is determined if any hosts connected to the FTAG will no longer be reachable if the link is pruned, i.e., to determine if the selected link provides a redundant path. Further to the example illustrated in FIG. 2A, FTAG A includes both ports 0 and 1 as fanout links. If any destination (host) subscribed to FTAG A is reachable through both ports 0 and 1, then port 0 can be pruned from FTAG A, as the traffic can be routed through port 1, without compromising reachability.

In some aspects, link pruning can be skipped if an alternative link is unavailable, or unable to absorb the traffic bandwidth from the pruned link. That is, link pruning decisions can also take into consideration whether the required increase in bandwidth for one or more alternative links exceeds an allowed bandwidth for those links. Further to the above example, pruning FTAG A at port 0 would cause the traffic to be routed through port 1, increasing the bandwidth throughput on port 1. As such, the increased traffic load on port 1 should not result in packet drops.

In some aspects, if it is determined that a bandwidth threshold for a new target port/link would be exceeded, alternative links can be considered for pruning. Alternatively, if no candidate FTAG links can be pruned, then determinations can be made regarding multicast tree pruning, as discussed in further detail with respect to network environment 201, below.

Figure 2B:
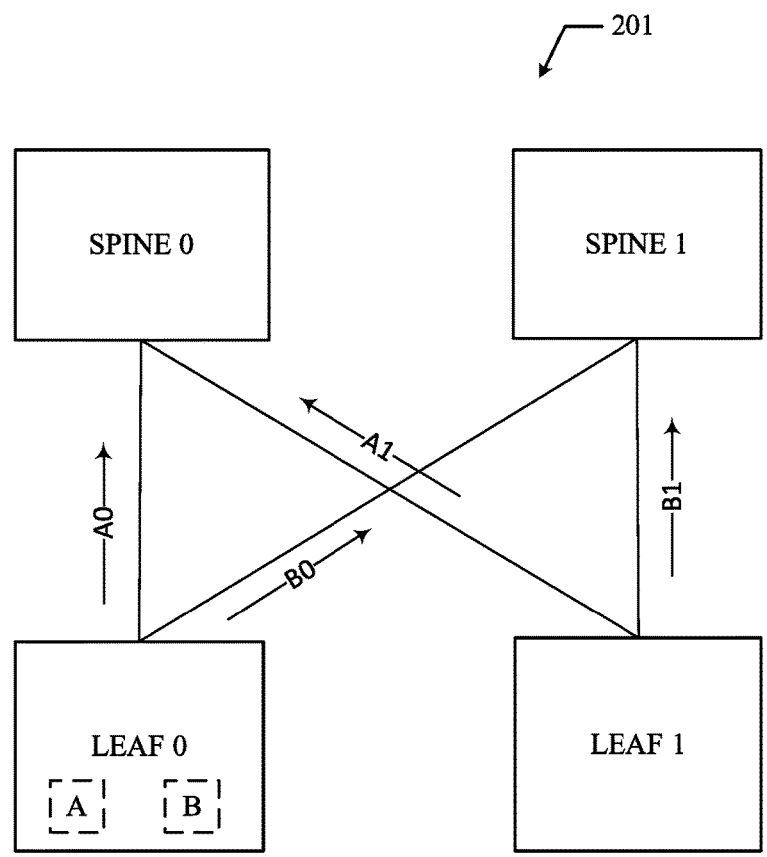
FIG. 2B illustrates a portion of a network fabric, including network devices such as leaf and spine switches, on which some aspects of the technology can be implemented.

FIG. 2B illustrates an example of a partial network environment 201, including network devices on which some aspects of the technology can be implemented. Environment 201 includes spine switches (Spine 0 and Spine 1), each connected to leaf switches (Leaf 0, and Leaf 1). It is understood that environment 201 only represents a portion of a network fabric, for example, as described with respect to network 100 in FIG. 1, above. In the illustrated example, spine and leaf switches are configured for carrying multicast flows originating from at least one host device connected to Leaf 0 and/or Leaf 1 (not illustrated), and for providing the multicast traffic to recipient hosts (not illustrated).

In implementations wherein the source switch (e.g., Spine 0 or Spine 1) can be configured to choose multiple FTAG trees for broadcast, selected FTAG trees can be pruned to reduce the load corresponding with that FTAG. In the example of FIG. 2B, if Spine 0 experiences FTAG A drops on a particular downlink port, bandwidth contributions for each link into Spine 0 (e.g., A0, and A1) can be computed to determine which provides the smallest bandwidth contribution. If link A0 is determined to have the smallest contribution that can also account for the packet drops on the downlink, link A0 may be more highly ranked for potential pruning than link A1. Subsequently, each ranked link can be examined to determine if the associated FTAG tree is part of an equal-cost multi-path (ECMP) set. In the illustrated example, Leaf 0 to Spine 0 has an ECMP set of FTAGs, i.e., FTAG A and FTAG B. If both FTAG A and FTAG B provide the same subscriber reachability, then either can be considered valid options for sending traffic, and thus FTAG A on Leaf 0 could be a candidate for pruning.

In order to complete FTAG pruning, it is first determined if alternate links have the capacity to absorb the additional traffic. Further to the above example, to prune FTAG A from Leaf 0, the link from Leaf 0 to Spine 1 (link B0) would need the capacity to absorb the traffic from link A0. If pruning the selected FTAG would result in packet drop mitigation, then FTAG A can be pruned, e.g., from the source ECMP list on Leaf 0. If flow performance would not be improved by pruning FTAG A, additional analysis/ranking of links can be performed, e.g., by re-analyzing reachability for the various FTAGs.

In some implementations, it may be determined that there are no suitable solutions for FTAG pruning. In such instances, multicast FTAG re-rooting can be considered. However, before FTAG movement is performed, suitability of FTAG re-rooting is considered, for example, by the controller (or other network monitoring process), on a spine-by-spine basis to determine if re-rooting in a new spine would improve flow performance. For example, if FTAG A is rooted in Spine 0 and needs to be moved, candidate spines could include Spine 1, as well as one or more other spines (e.g., Spine 2, not illustrated). If Spine 1 provides similar subscriber reachability as Spine 0, but Spine 2 does not, then only Spine 1 may be considered as a destination candidate for FTAG A.

Other parameters can also be considered. For example, before multicast re-rooting is performed, various ingress and egress ports of the candidate spine switch can be analyzed to determine if the added multicast bandwidth can be accommodated. By way of example, ingress and egress ports of Spine 1 can be analyzed to see if each can accommodate additional bandwidth resulting from traffic on links A0 and A1, should FTAG A be re-rooted in Spine 1. If the candidate destination spine is capable of absorbing the added traffic from FTAG A, re-rooting can be performed. Alternatively, no re-rooting is attempted, and a message or indication may be delivered to the network administrator, e.g., via the network controller, to indicate that multicast flow performance issues could not be resolved through network reconfiguration.

Although re-rooting can be performed automatically, because multicast re-rooting requires significant network configuration changes, in some aspects, re-rooting may be provided as an option, for example, to the network administrator before any network changes are implemented. In such instances, the administrator can be provided an alert indicating the new configuration to be pushed to move the multicast tree.

Figure 3:
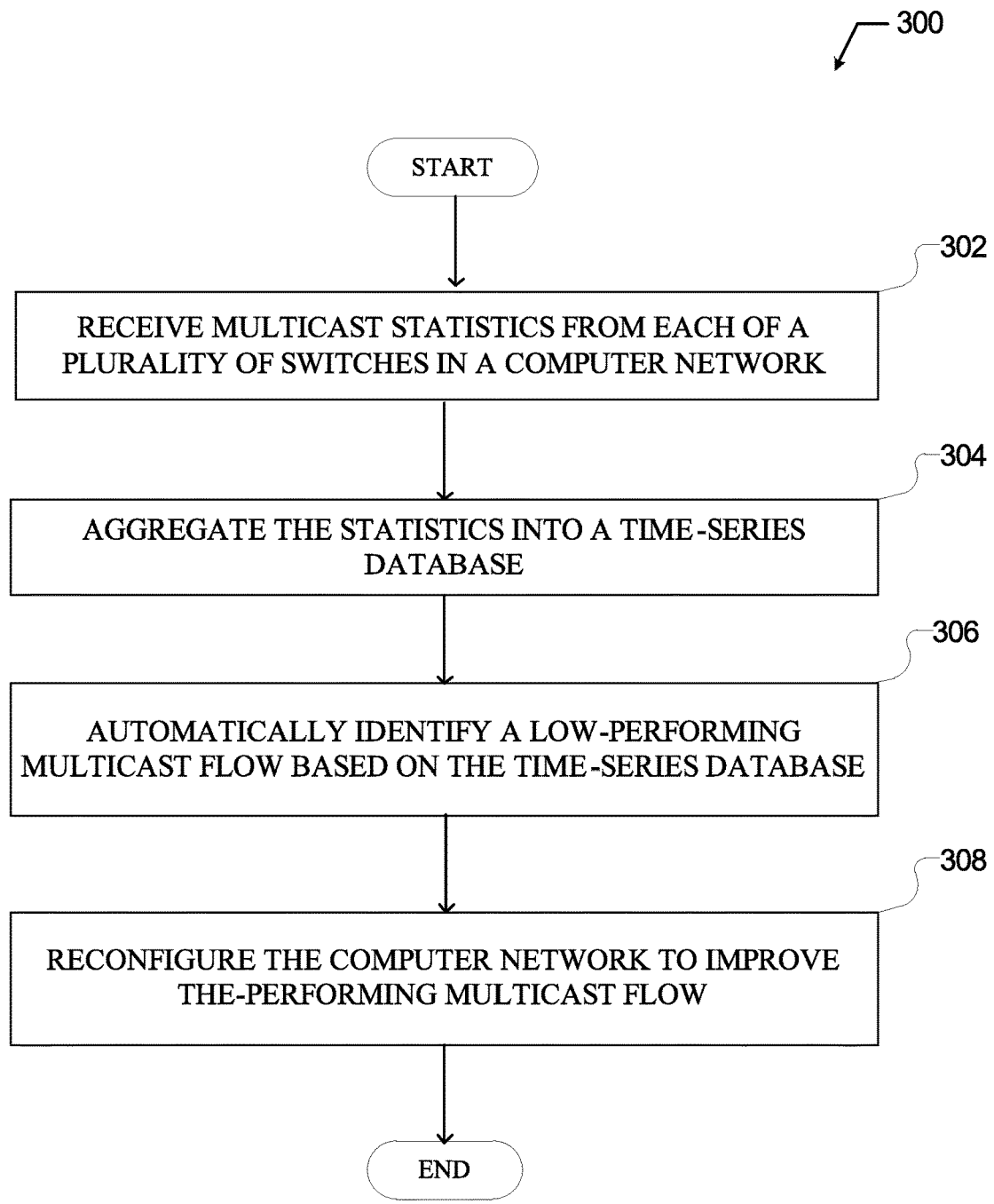
FIG. 3 illustrates a flow chart of an exemplary algorithm that can be used to automatically resolve multicast traffic performance issues, according to some aspects of the technology.

FIG. 3 illustrates a flow chart of an example process 300 used to resolve multicast traffic performance issues, according to some aspects of the technology. Process 300 begins with step 302 in which multicast statistics are received from multiple switches in a computer network. The multicast statistics can be received by a network controller, or other monitoring hardware and/or software. Statistics can be provided by an offload engine for a respective switch/router, and can include various types of metrics relating to current or historic device performance. For example, multicast statistics can indicate the frequency of packet drop events, or bandwidth statistics for particular flows, e.g., on a port-by-port basis.

In step 304, the multicast statistics are aggregated (e.g., by the network controller), into a time-series database. The time-series database can provide a snapshot of current and historic flow performance, e.g., for various FTAGs, across different leaf/spine switches in the network fabric. Subsequently, at step 306, low performing multicast flows are identified through analysis of the time-series database. As discussed above with respect to FIG. 2A, flows experiencing performance degradation can be identified for each switch/router on a port-by-port basis. Flow statistics for each FTAG/port pair can be aggregated for multiple switches/routers to determine overall performance for the multicast flow. Additionally, several different types of flow statistics can be considered when prioritizing multicast flows. For example, a flow can be selected/prioritized for further inspection based on a ratio of packet drop events to flow size (bandwidth). That is, flows with greater proportions of packet drops can be prioritized. Additionally, smaller multicast flows may be given precedence since redirection of smaller traffic volumes can be less disruptive to overall network performance.

Once a flow has been identified, different network reconfiguration options can be considered to improve flow performance. As discussed above, link pruning may be considered first, as link pruning can require the least impactful network configuration changes. If link pruning is determined to likely improve flow performance, without affecting host reachability, a new network configuration can be automatically pushed to redirect traffic around the pruned link/s. In some aspects, the new network configuration may first be provided to a network administrator or other user, for example, to give the administrator an opportunity to approve the new configuration before it is pushed. Alternatively, if link pruning is not possible, or determined to not improve flow performance, multicast pruning (e.g., FTAG pruning) can be considered.

In instances where multicast pruning is determined to improve flow performance, a new network configuration can be automatically pushed, e.g., to prune one or more identified FTAGs necessary to improve flow performance. In some approaches, multicast pruning may be presented as an option to a network administrator, e.g., via a network controller, so that the network administrator can approve the new network configuration before changes are pushed.

In aspects wherein multicast pruning is determined to not be a viable option, multicast re-rooting is considered. Determinations regarding whether multicast re-rooting can be performed can depend on the availability and performance metrics of a viable candidate switch (e.g., spine switch) in which the multicast flow can be re-rooted. As discussed above, subscriber reachability by the candidate destination is determined. Candidate destination switches offering full, or substantially complete, subscriber reachability can be preferred over switches with limited or less complete reachability. Because multicast re-rooting can involve substantial network reconfiguration, re-rooting may be presented as an option to the network administrator, including various details of the overall network impact, before configuration changes get pushed to the network.

FIG. 4 illustrates an example network device 410 that can be used to implement a spine and/or leaf router, as discussed above. Network device 410 includes a master central processing unit (CPU) 462, interfaces 468, and a bus 415 (e.g., a PCI bus). When acting under the control of appropriate software or firmware, the CPU 462 is responsible for executing packet management, error detection, and/or routing functions. The CPU 462 preferably accomplishes all these functions under the control of software including an operating system and any appropriate applications software. CPU 462 may include one or more processors 463 such as processors from the Intel, ARM, MIPS or Motorola family of microprocessors. In an alternative embodiment, processor 463 is specially designed hardware for controlling the operations of router 410. In a specific embodiment, a memory 461 (such as non-volatile RAM and/or ROM) also forms part of CPU 462. However, there are many different ways in which memory could be coupled to the system.

Interfaces 468 can be provided as interface cards (sometimes referred to as "line cards"). Generally, they control the sending and receiving of data packets over the network and sometimes support other peripherals used with the router 410. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 462 to efficiently perform routing computations, network diagnostics, security functions, etc.

Although the system shown in FIG. 4 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more non-transitory memories or memory modules (including memory 461) configured to store program instructions for general-purpose network operations and mechanisms necessary to implement the network reconfiguration methods discussed above. For example, memory 461 can include a non-transitory computer-readable medium that includes instructions for causing CPU 462 to execute operations for receiving traffic statistics from each of a plurality of switches in a computer network, aggregating the statistics into a time-series database, and automatically identifying a low-performing multicast flow, based on the time-series database. In some implementations, memory 461 can further include instructions for reconfiguring the computer network to improve the low-performing multicast flow.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method comprising:
   receiving, at a network controller, multicast traffic statistics from each of a plurality of switches in a computer network;
   aggregating, by the network controller, the multicast traffic statistics into a time-series database;
   automatically identifying, by the network controller, a low-performing multicast flow, based on the time-series database, wherein the low-performing multicast flow is associated with a source switch; and
   reconfiguring the computer network to improve the low-performing multicast flow;
   wherein identifying the low-performing multicast flow comprises computing a number of packet drop events associated with one or more forwarding tag (FTAG) and port pairs.

2. The computer-implemented method of claim 1, wherein reconfiguring the computer network further comprises:
   determining, by the network controller, if a multicast root corresponding with the low-performing multicast flow can be transferred to a destination switch in the computer network; and
   reconfiguring the source switch and the destination switch to transfer the multicast root to the destination switch.

3. The computer-implemented method of claim 2, wherein reconfiguring the source switch and the destination switch further comprises:
   providing an alert to a network administrator, via the network controller, the alert indicating a recommended network configuration to improve the low-performing multicast flow; and
   receiving a response from the network administrator, the response indicating either an approval or rejection of the recommended network configuration.

4. The computer-implemented method of claim 1, wherein reconfiguring the computer network further comprises:
   automatically pruning one or more links associated with the low-performing multicast flow.

5. The computer-implemented method of claim 1, wherein reconfiguring the computer network further comprises:
   automatically pruning a multicast tree associated with the low-performing multicast flow.

6. The computer-implemented method of claim 1, wherein identifying the low-performing multicast flow further comprises:
   computing a total packet throughput for one or more forwarding tag (FTAG) and port pairs.

7. A network controller for improving multicast traffic flows, comprising:
   one or more processors; and
   a non-transitory computer-readable medium comprising instructions stored therein, which when executed by the processors, cause the processors to perform operations comprising:
      receiving multicast traffic statistics from each of a plurality of switches in a computer network;
      aggregating the multicast traffic statistics into a time-series database;
      automatically identifying a low-performing multicast flow, based on the time-series database, wherein the low-performing multicast flow is associated with a source switch; and
      reconfiguring the computer network to improve the low-performing multicast flow;
      wherein identifying the low-performing multicast flow comprises computing a number of packet drop events associated with one or more forwarding tag (FTAG) and port pairs.

8. The network controller of claim 7, wherein reconfiguring the computer network further comprises:
   determining if a multicast root corresponding with the low-performing multicast flow can be transferred to a destination switch in the computer network; and
   reconfiguring the source switch and the destination switch to transfer the multicast root to the destination switch.

9. The network controller of claim 8, wherein reconfiguring the source switch and the destination switch further comprises:
   providing an alert to a network administrator the alert indicating a recommended network configuration to improve the low-performing multicast flow; and
   receiving a response from the network administrator, the response indicating either an approval or rejection of the recommended network configuration.

10. The network controller of claim 7, wherein reconfiguring the computer network further comprises:
    automatically pruning one or more links associated with the low-performing multicast flow.

11. The network controller of claim 7, wherein reconfiguring the computer network further comprises:
    automatically pruning a multicast tree associated with the low-performing multicast flow.

12. The network controller of claim 7, wherein identifying the low-performing multicast flow further comprises:
    computing a total packet throughput for one or more forwarding tag (FTAG) and port pairs.

13. A non-transitory computer-readable storage medium comprising instructions stored therein, which when executed by one or more processors, cause the processors to perform operations comprising:
    receiving multicast traffic statistics from each of a plurality of switches in a computer network;
    aggregating the multicast traffic statistics into a time-series database;
    automatically identifying a low-performing multicast flow, based on the time-series database, wherein the low-performing multicast flow is associated with a source switch; and
    reconfiguring the computer network to improve the low-performing multicast flow;
    wherein identifying the low-performing multicast flow comprises computing a number of packet drop events associated with one or more forwarding tag (FTAG) and port pairs.

14. The non-transitory computer-readable storage medium of claim 13, wherein reconfiguring the computer network further comprises:
- determining if a multicast root corresponding with the low-performing multicast flow can be transferred to a destination switch in the computer network; and
- reconfiguring the source switch and the destination switch to transfer the multicast root to the destination switch.

15. The non-transitory computer-readable storage medium of claim 14, wherein reconfiguring the source switch and the destination switch further comprises:
- providing an alert to a network administrator, the alert indicating a recommended network configuration to improve the low-performing multicast flow; and
- receiving a response from the network administrator, the response indicating either an approval or rejection of the recommended network configuration.

16. The non-transitory computer-readable storage medium of claim 13, wherein reconfiguring the computer network further comprises:
- automatically pruning one or more links associated with the low-performing multicast flow.

17. The non-transitory computer-readable storage medium of claim 13, wherein reconfiguring the computer network further comprises:
- automatically pruning a multicast tree associated with the low-performing multicast flow.

* * * * *